No. 849,512. PATENTED APR. 9, 1907.
H. B. STILLMAN.
DOUBLE ACTING SPRAG FOR VEHICLES.
APPLICATION FILED NOV. 30, 1906.
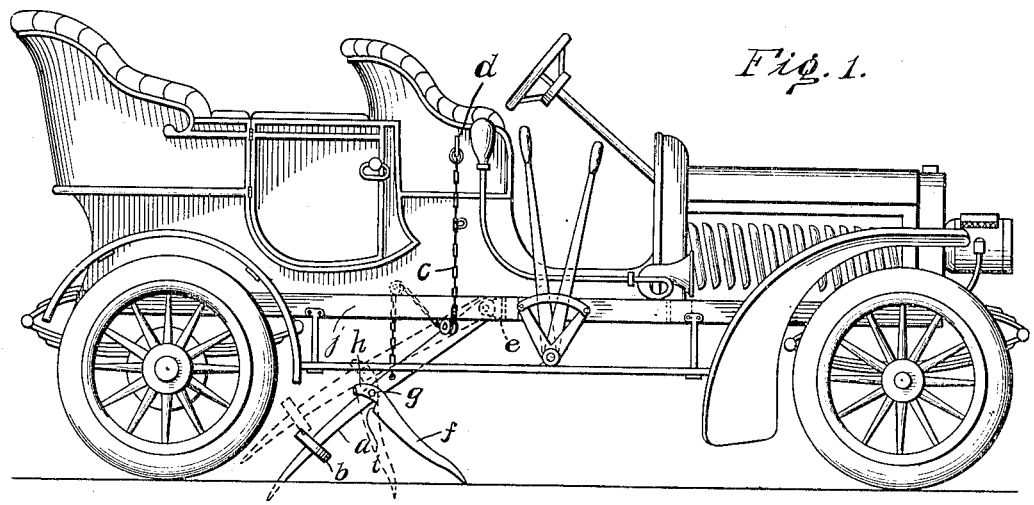
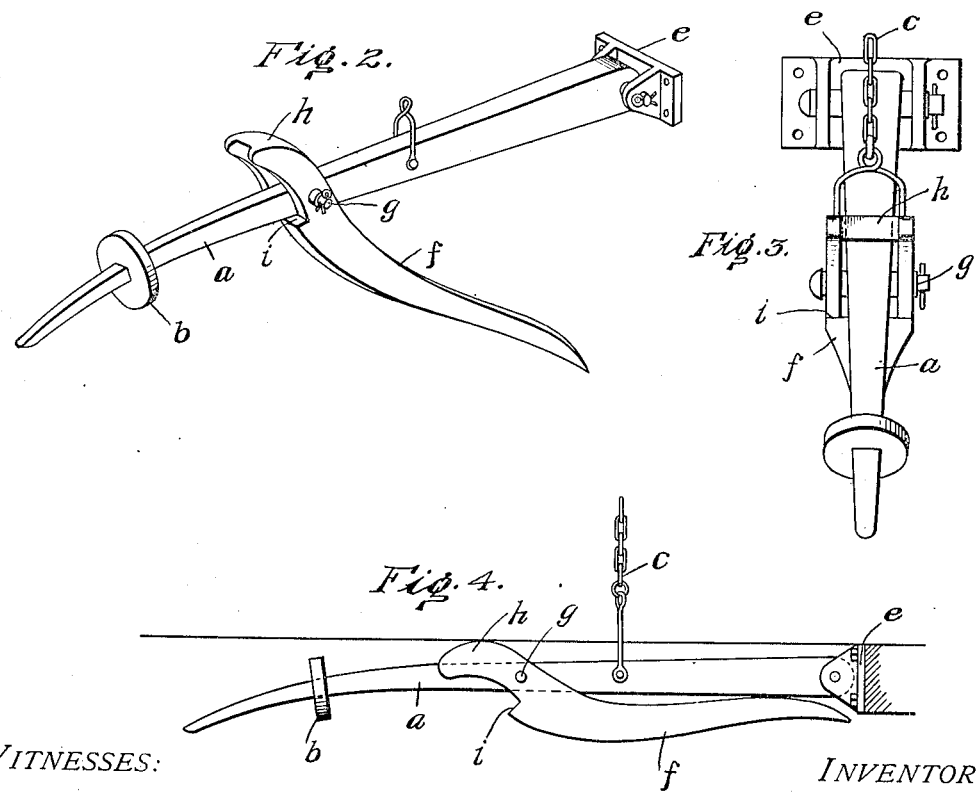
WITNESSES:
Dan'l Webster, Jr.
August Rittig
INVENTOR
Harold B. Stillman
BY
Attorney

UNITED STATES PATENT OFFICE.

HAROLD B. STILLMAN, OF PHILADELPHIA, PENNSYLVANIA.

DOUBLE-ACTING SPRAG FOR VEHICLES.

No. 849,512.  Specification of Letters Patent.  Patented April 9, 1907.

Application filed November 30, 1906. Serial No. 345,758.

*To all whom it may concern:*

Be it known that I, HAROLD B. STILLMAN, of the city and county of Philadelphia, State of Pennsylvania, have invented an Improvement in Double-Acting Sprags for Vehicles, of which the following is a specification.

It is the object of my invention to provide a double-acting sprag for vehicles—that is, a sprag which when released will act to arrest both the forward and backward motion of the vehicle.

Heretofore sprags have been used to arrest the motion in one direction and might be arranged to arrest either forward or backward motion, according to the direction in which they were placed. By the use of my double-acting sprag a single operation will act to arrest motion in either direction.

In carrying out my invention I employ a sprag-lever pivoted to the vehicle-frame and adapted to be raised or dropped on the ground and operating in the usual manner to arrest the motion in one direction and combine therewith a second oppositely-arranged sprag-lever pivoted to the first and dropped into operative position when the first lever is lowered to arrest motion in the other direction. The two levers are so arranged that when one is operative the other is out of action and neither impedes the other and that when one sprag-lever is lifted the other is automatically folded back, so as not to act as a depending obstruction.

In the drawings, Figure 1 is a side elevation of my double-acting sprag, showing the same applied to a motor-car. Fig. 2 is a perspective view showing the sprag in lowered position. Fig. 3 is a front elevation of the same, and Fig. 4 is a side elevation with the sprag lifted.

$a$ is one sprag-lever, which is hinged at one end to the frame of the vehicle and has its free end adapted when lowered to strike the ground. The free end of this sprag-lever $a$ adjacent to its extremity may be provided with an enlargement, as $b$, to prevent the point or end running far into the ground when the sprag is in action. This enlargement causes this sprag to act like a plow and to retard the backward motion of the vehicle without running very deeply in the ground.

The sprag-lever $a$ may be raised and lowered by any convenient means. For this purpose I have shown a chain $c$, extending through the frame over suitable guides to a point convenient to the hand of the driver, where it may be attached to a hook $d$. When in this position, the sprag-lever is raised, as shown in Fig. 4.

Any suitable means may be provided for attaching the lever $a$ to the frame of the vehicle. I have shown it hinged to a plate $e$, adapted to be attached to the frame.

When the sprag-lever $a$ is raised, as shown in Fig. 4, it is out of action; but when dropped, as shown in full lines in Fig. 1, its end will enter the surface of the ground and stop or retard backward motion of the vehicle.

A sprag thus constructed and operating is well known, and I do not mean to claim it alone as part of my invention; but such a sprag acts in one direction only, usually to prevent backward motion, and my invention relates to the combination, with such a member, of a second sprag acting in the opposite direction, so that on the release of the device the motion of the vehicle in either direction will be prevented. This auxiliary sprag is in the form of a lever $f$, hinged, as at $g$, to the sprag-lever $a$, with its point in the opposite direction to the point of the sprag $a$. The upper end of the lever $f$ has a heel or extension $h$ above the lever $a$, and the lever $f$ is provided with a shoulder or lug $i$ adjacent to the pivot, which acts as a stop to limit the descent of the lever $f$, when it is allowed to drop on its pivot, as shown in Figs. 2 and 3.

When the sprag-lever $a$ is released, the sprag $f$ will fall by gravity, as shown in Fig. 2. The length of the lever $f$ from its pivot is preferably such that its end will be lower than the end of the sprag $a$, so that it will rest loosely on the surface of the ground when the sprag $a$ touches the ground, as shown in full lines in Fig. 1. If the movement of the car is backward, the sprag will be dragged over the surface while the sprag $a$ is acting. If the movement is forward, the point of the sprag $f$ will be forced into the ground, and the shoulder $i$, acting on the lever $a$, will elevate that lever, as shown in dotted lines in Fig. 1.

The sprag $f$ is preferably formed with a slight downward curvature toward its extremity, as shown. This insures the sprag entering the ground in the forward motion of the car. The device will thus act to arrest the movement of the car in either direction, and neither of the sprags $a f$ will interfere with the action of the other.

When the sprag $a$ is lifted, the heel $h$ of the sprag $f$ will make contact with the frame $j$ and fold up the sprag $f$ under the rear end of the sprag $a$, as shown in Fig. 4. Both the members $a$ and $f$ are then raised under the vehicle-frame out of the way of projections or obstructions on the road-bed.

I claim—

1. A double-acting sprag for arresting the motion of vehicles in either direction consisting of two levers pivoted together and having their free ends pointing in opposite directions, one of said levers being adapted to be pivotally connected with the frame of the vehicle.

2. A double-acting sprag for arresting the motion of vehicles in either direction consisting of two levers pivoted together and having their free ends pointing in opposite directions, one of said levers being adapted to be pivotally connected with the frame of the vehicle and the other lever being provided with a heel or extension beyond the pivot-point and above the other lever.

3. A double-acting sprag for arresting the motion of vehicles in either direction consisting of two levers pivoted together and having their free ends pointing in opposite directions, one of said levers being adapted to be pivotally connected with the frame of the vehicle and the other lever being provided with a heel or extension beyond the pivot-point and above the other lever, and with a stop to limit its angular position with reference to said other lever.

4. A double-acting sprag for arresting the motion of vehicles in either direction consisting of two levers pivoted together and having their ends pointing in opposite directions, one of said levers being adapted to be pivotally connected with the frame of the vehicle, and a limit-stop between said levers to limit their angular position with reference to one another when lowered.

5. The combination of a sprag-lever adapted to be pivoted at one end to the frame of a vehicle, and a second sprag-lever pivotally connected with first sprag-lever and pointing in the opposite direction.

6. The combination of a sprag-lever adapted to be pivoted at one end to the frame of a vehicle and a second sprag-lever pivotally connected with said first sprag-lever and pointing in the opposite direction, the length of said second sprag-lever from the pivot-point being greater than the length of the first sprag-lever from said pivot-point to its extremity.

7. The combination of a sprag-lever adapted to be pivoted at one end to the frame of a vehicle and a second sprag-lever pivotally connected with said first sprag-lever and pointing in the opposite direction, the length of said second sprag-lever from the pivot-point being greater than the length of the first sprag-lever from said pivot-point to its extremity, and means to limit the angular position of said levers with reference to one another.

8. The combination of a sprag-lever adapted to be pivoted at one end to the frame of a vehicle and a second sprag-lever pivotally connected with said first sprag-lever and pointing in the opposite direction, said second sprag-lever having a heel extending from its pivot-point above the first sprag-lever and adapted to strike the frame of the vehicle and raise the second sprag-lever when the first sprag-lever is lifted.

9. The combination of the sprag-lever $a$, having means for attachment to the frame of the vehicle, and the sprag-lever $f$ pivoted to the sprag-lever $a$ and having the heel $h$ extending beyond the pivot and above the sprag-lever $a$ adapted to strike the frame of the vehicle and raise the sprag-lever $f$ when the sprag-lever $a$ is lifted, and also having a stop $i$ adapted to strike the sprag-lever $a$ and limit the angular position of the sprag-lever $f$ with reference to said sprag-lever $a$.

10. The double-acting sprag for vehicles, consisting of two levers pivoted together and having their free ends pointing in opposite directions, one of said levers being adapted to be pivotally connected with the frame of the vehicle, and the other lever having a downward curvature toward its extremity.

In testimony of which invention I have hereunto set my hand.

HAROLD B. STILLMAN.

Witnesses:
 ERNEST HOWARD HUNTER,
 R. M. KELLY.